United States Patent
Witt et al.

(10) Patent No.: US 6,465,608 B1
(45) Date of Patent: Oct. 15, 2002

(54) METHOD FOR DRYING AND DEGASSING POLYOLEFINS

(75) Inventors: Michael Witt, Rotorua (NL); Paulus De Lange, Wesseling (DE); Thomas Perner, Essingen (DE); Andreas Deckers, Flomborn (DE); Kaspar Evertz, Schifferstadt (DE); Dieter Lilge, Limburgerhof (DE)

(73) Assignee: Basell Polyolefine GmbH (DE)

( * ) Notice: Subject to any disclaimer, the term of this patent is extended or adjusted under 35 U.S.C. 154(b) by 0 days.

(21) Appl. No.: 09/980,566

(22) PCT Filed: May 11, 2000

(86) PCT No.: PCT/EP00/04259

§ 371 (c)(1),
(2), (4) Date: Nov. 15, 2001

(87) PCT Pub. No.: WO00/69919

PCT Pub. Date: Nov. 23, 2000

(30) Foreign Application Priority Data

May 18, 1999 (DE) .......................... 199 22 677

(51) Int. Cl.[7] .................................................. C08F 6/00
(52) U.S. Cl. ..................................................... 528/480
(58) Field of Search ......................................... 528/480

(56) References Cited

U.S. PATENT DOCUMENTS

| | | | |
|---|---|---|---|
| 4,338,424 A | 7/1982 | Morita et al. ................. | 526/65 |
| 4,424,341 A | 1/1984 | Hanson et al. ............... | 528/501 |
| 5,071,950 A | 12/1991 | Borho et al. ................. | 528/483 |
| 6,008,154 A | 12/1999 | Rosendorfer et al. ....... | 502/319 |

FOREIGN PATENT DOCUMENTS

| | | |
|---|---|---|
| EP | 127253 | 12/1984 |
| EP | 341540 | 11/1989 |
| EP | 683176 | 11/1995 |
| EP | 728772 | 8/1996 |
| EP | 801081 | 10/1997 |
| EP | 838261 | 4/1998 |
| WO | 93/13843 | 7/1993 |

*Primary Examiner*—Terressa M. Boykin
(74) *Attorney, Agent, or Firm*—Connolly Bove Lodge & Hutz LLP

(57) ABSTRACT

The invention relates to a method for drying and degassing polyolefins in which the polymerization product leaving a polymerization reactor is brought into contact with a degassing medium and simultaneously decompressed. The degassing medium employed according to the invention is the monomer to be polymerized, which, in particular, flows through a decompression tank in a circulation process and which is preferably also enriched with ethylene or other low-boiling olefins in an amount in the range from 0 to 100 mol %, based on the total amount of circulating gas. A polymerization in an amount of up to 10%, based on the total polymerization conversion, takes place in accordance with the invention inside the decompression tank.

18 Claims, No Drawings

METHOD FOR DRYING AND DEGASSING POLYOLEFINS

The present invention relates to a method for drying and degassing polyolefins in which the polymerization product leaving the polymerization reactor is decompressed and then brought into contact with a degassing medium. The invention also relates to a polyethylene prepared in this way.

The invention basically relates to all industrially feasible variants of the method of olefin polymerization, such as suspension polymerization, gas-phase technology, solution polymerisation and combinations thereof (cascade technology).

The solid polymerization product obtained after the polymerization reaction usually still contains, as impurities, certain amounts of unconsumed starting materials and of solvents employed in the polymerization. The drying and degassing of the polymerization product which are necessary for safety, environmental and organoleptic reasons generally mean high costs, since, in particular, relatively high-boiling comonomers can only be removed slowly and thus at high cost.

A known degassing method comprises employing ethylene directly as a degassing medium, since in this way closed circuits to the polymerization reactor are possible. Thus, EP-A-0 341 540 describes a method in which, after pressure reduction, the reaction mixture is separated into a gaseous phase and a solid phase. The solid phase is then firstly pre-rinsed continuously with gaseous ethylene and, in a second step, post-rinsed with $N_2/H_2O$. Post-polymerization is not mentioned in this specification, but instead the same degassing efficiency as with inert gas is described. However, it has been found, disadvantageously, in a practical experiment that the method disclosed in this citation can result in considerable fisheye formation due to the presence of the ethylene.

Direct incorporation of unconsumed starting materials, in particular the relatively high-boiling comonomers, into the polymer product before deactivation of the catalysts is explicitly mentioned in EP-A-0 801 081. The degassing is carried out using an ethylene/hydrogen mixture in addition to inert gas, and it has been found to be particularly advantageous that the post-polymerization causes the liberation of heat energy, with the aid of which the degassing is accelerated.

A further method is described in EP-A-0 728 772 for gas-phase reactors.

In this method, the product is, as usual hitherto, discharged by opening a valve located in the polymerization reactor. However, the product is not conveyed directly into the degassing tank, but instead is firstly transferred into a so-called intermediate tank, which is subsequently closed again via valves, and where a post-polymerization takes place under substantially identical temperature and pressure conditions as in the actual reactor. The problem in this method is that the intermediate tank easily becomes blocked, and that the usual fluidized-bed density is firstly discharged from the polymerization reactor, i.e. a large amount of compressed reactor gas is discharged concomitantly per product mass unit. In addition, the sealed reaction space means that the monomer mixture present is initially depleted in ethylene, and low-density polyethylene thus tends to form. However, the sealed polymerization space means that the proportion of polymer formed here is negligible and thus does not influence the product properties to a significant extent.

EP-B 127 253 has likewise already described a method for drying and degassing polyolefins in which the degassing medium employed is the monomer to be polymerized. However, no polymerization takes place in the degassing tank there, but instead the mixture of desorbed monomers and monomers serving as degassing medium is fed back into the polymerization reactor, where the polymerization then takes place. This citation does not give any indication to the person skilled in the art of the particular way in which the method is carried out in accordance with the present invention.

The object of the present invention was to indicate a method for drying and degassing solid polyolefin in which the effectiveness of the drying or degassing is increased through specific use of post-polymerization in the decompression zone and at the same time the polymer properties can be influenced in a very targeted manner through the post-polymerization in the degassing step. A further object was to provide a polyethylene prepared in this way.

This object is achieved by a method of the generic type mentioned at the outset, whose characterizing feature is to be regarded as that the degassing medium employed is the monomer to be polymerized, which flows through the decompression tank in a circulation process, and in that polymerization takes place in the degassing tank in an amount of up to 10%, based on the total polymerization conversion.

In a particularly preferred embodiment of the method according to the invention, the degassing medium flowing through the decompression tank in a circulation process is enriched with ethylene or other low-boiling olefins in an amount in the range from 0 to 100 mol %, based on the total amount of circulating gas, and is subjected to temperature control.

The temperature conditions within the decompression tank are matched to the requirements inasmuch as the temperature is usually from 5 to 10 K above the temperature prevailing in the polymerization reactor.

Through the method according to the invention, some or even all of the total amount of olefin starting material required can be introduced into the process via the decompression tank. A gas separation unit is accordingly not necessary in accordance with the invention.

In a particularly preferred embodiment of the method according to the invention, the decompression tank employed is a fluidized-bed reactor. Use of a fluidized-bed reactor of this type in the degassing zone is known per se: thus, heated hydrocarbon gas is used as stripping gas in WO-A-93/13843.

U.S. Pat. No. 4,424,341 describes successive pressure reduction in the downstream area. The aim is to be able to re-liquefy the evaporated fraction of suspension medium by simple cooling. According to the teaching in this citation, the first decompression tank is operated as a fluidized bed.

The method according to the invention enables the preparation of polyolefins from olefins having from 2 to 20 carbon atoms, preferably from 2 to 10 carbon atoms. The monomers employed can also be cyclic olefins, such as cyclopentene or norbornene. For the purposes of the present invention, the term "polyolefins" is also taken to mean copolymers of monomers having a different number of carbon atoms. Polyethylene (PE) can particularly preferably be prepared in accordance with the invention.

In summary, the ethylene introduced into the degassing tank simultaneously takes on a number of functions in accordance with the invention:

1. It is a component of the degassing medium, which can remain in the closed return-gas circuit both in suspension technology and in the fluidized-bed method. Nitrogen, for example, would have to be removed at considerable effort, i.e. the gas stream would have to be separated into its individual components by complex operations.

2. The post-polymerization in the degassing tank causes a reduction in the content of high-boiling comonomers (for example hexene), thereby significantly reducing the degassing effort.

3. The polymer formed in the degassing step has a significant effect on the product and/or processing properties. By varying the temperature and pressure conditions in the decompression tank, there is a certain degree of freedom to match the product properties (and to reduce high-boiling comonomers).

A specific application of the method according to the invention comprises PE products having a density of 0.94 g/cm$^3$ and an HLMI (190° C./21.4 kg in accordance with ISO 1133) of about 20, which are employed, inter alia, for pipe coatings and as material for plastic pipes. A very important quality criterion is, inter alia, the so-called ESCR value (rupture strength under defined experimental conditions). It has been found, for example, that good results are obtained if the polymer contains a low-molecular-weight component which is free from comonomer. Even a very small amount of comonomer, in the region of a few percentage points, has a serious effect on the ESCR level. A low-molecular-weight PE of this type is usually referred to as wax and can be incorporated, for example, during granulation in an extruder or compounder. A typical blend product results.

An alternative method comprises using a cascade technology, in which, for example, firstly a homopolymer of low molecular weight is produced in a first reactor and is then transferred into a second reactor, where a polymer of high molecular weight and high comonomer concentration is then produced.

The method according to the invention proceeds via specific post-polymerization in the degassing zone, using a decompression tank and with metering-in of ethylene. The temperature in the decompression tank is higher than that in the reactor and is preferably set by a control mechanism to a constant value in the range from 70 to 135° C. with a variation latitude $\Delta T$ of at most 2 K, resulting, depending on the polymerization method and the respective catalyst employed, in the desired low-molecular-weight and low-comonomer polymer being formed.

Polyethylene prepared by the above-described method according to the invention has a broad molecular weight distribution, expressed by a high ratio of its weight average molecular weight ($M_w$) to its number average molecular weight ($M_n$), as described in Hoffmann et al., Polymeranalytik [Polymer Analysis], Georg Thieme Verlag, Stuttgart (1977), Chapters 2.1.3 and 6.2.4.

The working examples described below are intended to make the invention more understandable and comprehensible to the person skilled in the art.

EXAMPLE 1

According to the Invention

Ethylene was polymerized together with hexene and hexane (precise composition: 50% by volume of nitrogen, 3% by volume of hexane, 0.25% by volume of hexene, remaining 46.75% by volume of ethylene) in a gas-phase fluidized-bed reactor with a total capacity of 0.18 m$^3$ at a pressure of 2 MPa (20 bar) and a temperature of 110° C. in the presence of a chromium catalyst which had been adsorbed onto a porous $SiO_2$ support and activated for a period of 2 hours at a temperature of 700° C. The crude polyethylene was then transferred out of the reactor into a decompression tank, into which an amount of 10% by weight of ethylene, based on the total amount of discharged polyethylene, was metered at the same time. The pressure in the decompression tank was 2000 hPa (corresponding to 1 bar above atmospheric pressure), and the temperature was 120° C. The properties of the polyethylene and the efficiency of the degassing (residual $C_6$-hydro-carbon content) are compared with the results of the comparative example in Table 1 below.

Comparative Example

Polyethylene was prepared as in Example 1, but the decompression tank was flushed with pure nitrogen instead of ethylene. The results are shown in the table below.

TABLE

|  | Example 1 | Comparative Example |
|---|---|---|
| Residual $C_6$—HC content at the decompression tank [ppm] | | |
| Inlet | 1500 | 1500 |
| Outlet | 100 | 300 |
| Density [g/cm$^3$] | 0.938 | 0.935 |
| HLMI$_{190°/21.4}$ [dg/min] | 22 | 20 |
| $M_w/M_n$ | 15 | 11 |
| ESCR [h]* | 120  ±10 | 90  ±10 |

*The ESCR measurement value was determined by producing disc-shaped test specimens which had a diameter of 38 cm and a thickness of 2 mm. The test specimens were provided on one side with a centred notch, which had a length of 20 mm and a depth of 200 $\mu$m. The notched test specimens were then clamped into a ring-shaped holder and dipped on both sides into a surfactant solution comprising 5% of ® Lutensol FSA (commercial product from BASF AG) at a temperature of 80° C. and subjected to a pressure of 3 bar. The time from application of the pressure to fracture of the disc is monitored using an electronic pressure control device and stopped automatically (data in hours).

The arithmetic mean and standard deviation are determined from five measurements, with typical standard deviations being in the range up to a maximum of 10%. Measurement series lasting more than 200 hours are terminated and re-started at higher temperature with new test specimens.

The colour of the Lutensol solution is checked visually every day and replaced in the case of deviations. The maximum interval between two changes is 1 month. The solvent level in the heating bath is kept constant by means of an external level regulator, and evaporation losses are automatically compensated for by demineralized water.

What is claimed is:

1. A method for drying and degassing polyolefins which comprises decompressing a polymerization product leaving a polymerization reactor and then bringing into contact with a degassing medium, and the degassing medium employed is the monomer to be polymerized, which flows through a decompression tank in a circulation process, and in that a polymerization in an amount of up to 10%, based on the total polymerization conversion, takes place in the decompression tank.

2. The method according to claim 1, wherein the decompression medium, which flows through the decompression tank in a circulation process, is enriched with ethylene or other low-boiling olefins in an amount in the range up to 100 mol %, based on the total amount of circulating gas, and subjected to temperature control.

3. The method according to claim 1, wherein the temperature and pressure conditions inside the decompression tank are in the range from 70 to 135° C. and from 1200 to 3000 hPa.

4. The method according to claim 1, wherein the decompression tank employed is a fluidized-bed reactor.

5. The method according to claim 1, wherein the polyolefins are prepared from olefins having from 2 to 20 carbon atoms, where the monomer is a cyclic olefin.

6. The method according to claim 1, wherein the polyethylene is prepared and has a density in the range from 0.90 to 0.96 g/cm$^3$.

7. The method according to claim 1, wherein the temperature in the decompression tank is set higher than the temperature in the reactor, with a low-molecular-weight and low-comonomer polymer, based on the molecular weight and comonomer incorporation of the polymer leaving the polymerization reactor, being formed in the decompression tank.

8. Polyethylene prepared by the method according to claim 1, wherein the polyethylene has a molecular weight distribution, expressed by the ratio of $M_w$ to $M_n$, of 15.

9. The method according to claim 5, wherein the polyolefins are prepared from olefins having from 2 to 10 carbon atoms and the monomer is cyclopentene or norbonene.

10. The polyolefin according to claim 8, wherein the polyethylene has a density in the range from 0.90 to 0.96 g/cm$^3$.

11. The polyethylene as claimed in claim 8, wherein the polyethylene has a density of 0.94 g/cm$^3$.

12. A pipe coating which comprises the polyethylene as claimed in claim 8.

13. A plastic pipe made from the polyethylene as claimed in claim 8.

14. The method according to claim 2, wherein the temperature and pressure conditions inside the decompression tank are in the range from 70 to 135° C. and from 1200 to 3000 hPa.

15. The method as claimed in claim 14, wherein the decompression tank employed is a fluidized-bed reactor.

16. The method according to claim 15, wherein the polyolefins are prepared from olefins having from 2 to 20 carbon atoms, wherein the monomer is a cyclic olefin.

17. The method according to claim 16, wherein the polyethylene has a density in the range from 0.90 to 0.96 g/cm$^3$.

18. The method as claimed in claim 17, wherein the temperature in the decompression tank is set higher than the temperature in the reactor.

* * * * *